Nov. 10, 1964 R. B. WILLIAMS 3,156,128
GEAR BELT
Filed Dec. 26, 1962 2 Sheets-Sheet 1

INVENTOR.
ROBERT B. WILLIAMS
BY
ATTORNEY

Nov. 10, 1964 R. B. WILLIAMS 3,156,128
GEAR BELT
Filed Dec. 26, 1962 2 Sheets-Sheet 2

INVENTOR.
ROBERT B. WILLIAMS
BY
ATTORNEY

# United States Patent Office 3,156,128
Patented Nov. 10, 1964

3,156,128
GEAR BELT
Robert B. Williams, Wethersfield, Conn., assignor to The Russell Manufacturing Company, Middletown, Conn., a corporation of Connecticut
Filed Dec. 26, 1962, Ser. No. 246,928
2 Claims. (Cl. 74—232)

This invention relates to gear belts and has for an object to provide a belt having novel and improved characteristics.

Another object is to provide a gear belt which is molded from a plastic composition with integral gear teeth on its inner surface and which includes a tension member having novel and improved characteristics.

Another object is to provide a gear belt of the above type which is adapted to flex readily without introducing undue strains for passing around gear pulleys of small diameter.

Another object is to provide a belt of the above type having improved tooth shear strength.

Various other objects and advantages will be apparent from the following description, taken in connection with the accompanying drawings in which a specific embodiment has been set forth for purposes of illustration.

Figure 1:
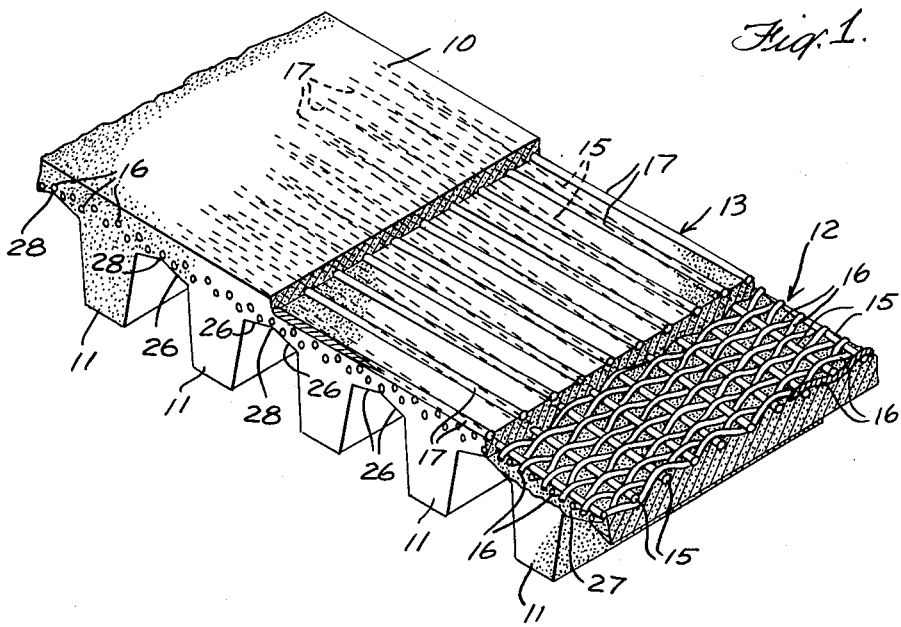
FIG. 1 is a broken perspective view of a portion of a belt embodying the invention with parts broken away for clarity.

Referring to the drawings more in detail the invention is shown as embodied in a belt having a backing portion 10 and teeth 11 molded as a unit from a synthetic plastic such as polyurethane or from a natural or synthetic rubber composition. The belt includes a pair of tension members 12 and 13 which extend along the belt at a point spaced above the base 14 of the teeth and are embedded within the material, of the backing 10. The tension member 12 is in the form of a woven fabric sleeve having warp yarns 16 extending transversely of the belt. The weave is such that the warpwise yarns 16 are crimped or waved as they pass over and under successive fillerwise yarns 15, while the fillerwise yarns 15 are substantially straight and extend longitudinally of the belt in the form of a helix.

The second tension member 13 comprises a layer of yarns 17 wound around the fabric layer 12 in the form of a helix having a pitch opposite to that of the fillerwise yarns 15 of the fabric layer 12 so as to eliminate any tendency of the belt to creep sidewise on its pulleys.

Figure 3:
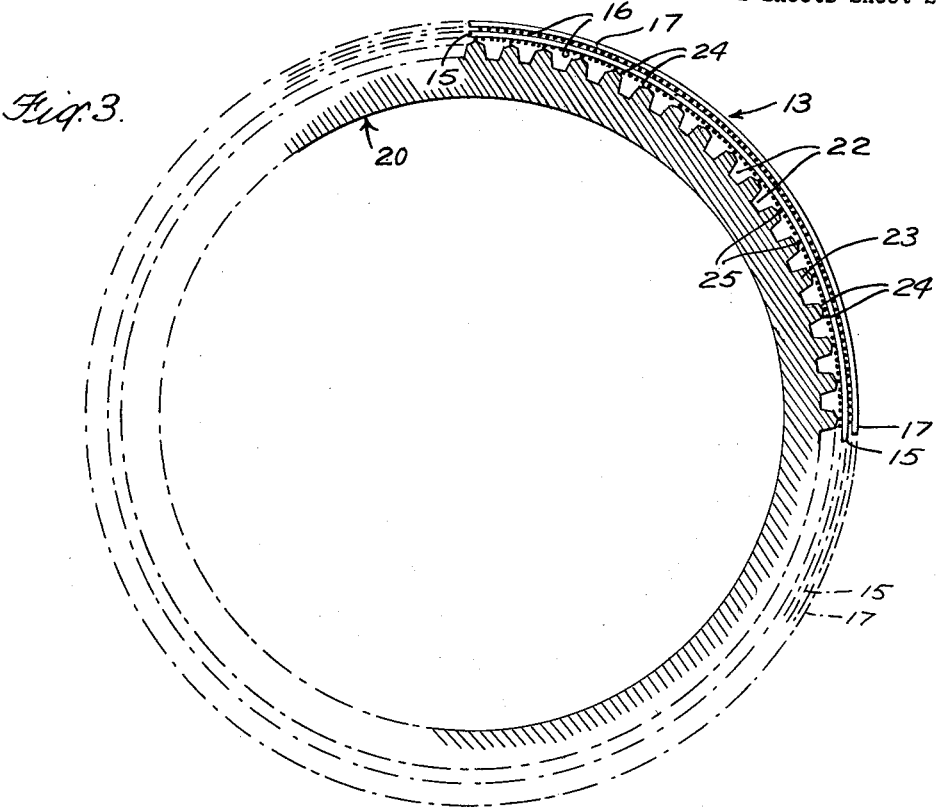
FIG. 3 is a transverse section through a mold core showing the tension members thereon prior to insertion into a mold for molding the belt.
Figure 4:
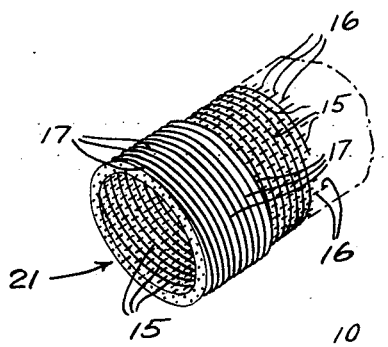
FIG. 4 is a perspective view of the fabric sleeve which constitutes one of the tension members.

The mold core for making the belt is shown in FIG. 3 as comprising a tube 20 having a plurality of grooves 22 formed in the surface thereof, the grooves having a shape corresponding to that of the teeth 11 of the belt to be molded thereon and having ribs 23 between the grooves 22 corresponding in shape to the shape between the teeth 11 of the belt. The ribs 23 are each formed with a pair of transversely sloping surfaces 24 intersecting in a ridge or peak 25. The sloping surfaces 24 form correspondingly sloping surfaces 26 between the teeth 11 of the belt for the purpose to be described.

For molding the belt a sleeve 21 of the type above described its first placed over the core. The sleeve is preferably so woven that it fits tightly on the core or is slightly stretched in being so placed. This causes the filler yarns 15 to become substantially straight and helical in form and transfers the crimp to the smaller warp yarns 16. A layer 13 of yarns 17 is then wound over the fabric sleeve to form a helical winding having a pitch opposite to that of the fillerwise yarns 15 of the sleeve 21.

The core assembly is then placed in an outer mold of the type shown for example in Schmidt Patent No. 2,983,637 and the belt tubing is molded under sufficient pressure to cause the material to flow through the interstices of the tension member and between the fabric sleeve 21 and the core surfaces to form a belt tube which is then sliced transversely into belts of the desired width.

Due to the ridges 25 of the mold and the thickness of the warp yarns 16 the tension members 15 are spaced above the surfaces 24 so that the plastic material enters the space between such surfaces and the adjacent fabric to form wedge-shaped fillets 27 having sloping under surfaces 26 extending from the midpoint 28 of the space between teeth to the base 14 of the teeth. These fillets 27 cover the fabric sleeve except at the point 28 where the ridges 25 engage the sleeve 21.

Figure 2:
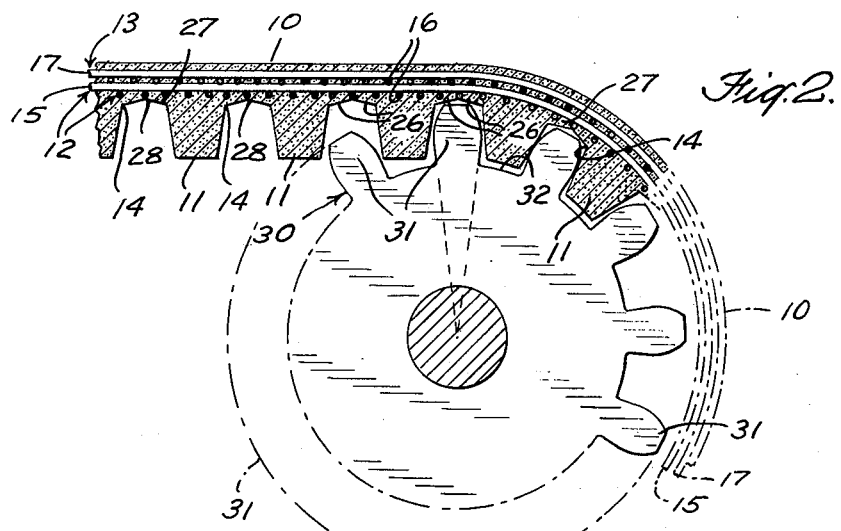
FIG. 2 is a detail illustrating the belt meshing with the teeth of a gear pulley.

The fillets 27 serve to space the tension members above the base of the teeth and also provide areas of increased resistance to flexing so that the fillets bend in the form of a smooth curve as the belt flexes around the cylindrical surface of a gear pulley as shown in FIG. 2. Since the surfaces 26 slope in both directions from the center point 28 the belt is free to bend about a small diameter gear pulley without binding or introducing excessive strains in the tension members.

The tension members 15 and 17 are preferably made of Dacron, a polyester of terephthalic acid and ethylene glycol, which has the property of bonding firmly to polyurethane, the warp yarns 16 may be of smaller denier than the tension members and may be made of other material such as cotton for economy.

FIG. 2 illustrates the application of such a belt to a gear pulley having gear teeth 31 separated by grooves 32 into which the teeth 11 of the belt mesh. It will be noted that the teeth 11 enter the grooves 32 to a depth such that the fillets 27 engage the outer peripheral surface of the gear pulley with the tension members 15 and 17 spaced above the belt dedendum circle by the depth of the fillets 27.

Figure 5:
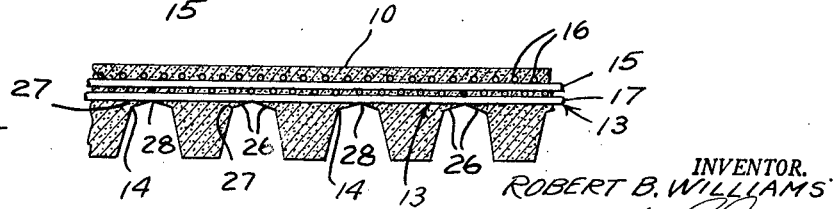
FIG. 5 is a detail view, similar to FIG. 2, illustrating a belt having a different arrangement of tension members.

The embodiment of FIG. 5 is similar to that above described except that the layer 13 of the yarns 17 is disposed below the fabric sleeve 21. The relative position of the tension members may be varied by altering the slope of the surfaces 24 and the thickness of the backing may be varied according to the load to which the belt is to be subjected.

What is claimed is:

1. A gear belt composed of a molded plastic material comprising a backing portion with gear teeth integrally molded on one surface thereof, said backing portion having inner and outer layers of tension members embedded therein, one of said layers comprising a woven fabric sleeve having filler yarns and warp yarns, said filler yarns being substantially straight and extending helically around said belt to constitute a tension member, and said warp yarns extending transversely of the belt in crimped form to bind the filler yarns in place, said inner tension member being spaced above the base of said teeth and a fillet of said molded plastic material extending from the base of each tooth along the under surface of said inner tension member to about the midpoint of the space between teeth, said fillets being wedge-shaped and decreasing uniformly in thickness from the base of said teeth to said midpoint.

2. A gear belt composed of a molded plastic material comprising a backing portion with gear teeth integrally molded on one surface thereof, said backing portion having inner and outer layers of tension members embedded therein, one of said layers comprising a woven fabric sleeve having filler yarns and warp yarns, said filler yarns being substantially straight and extending helically around said belt to constitute a tension member, and said warp yarns extending transversely of the belt in crimped form to bind the filler yarns in place, the other of said layers of tension members comprising a yarn extending lengthwise of said belt in the form of a helical winding, the helical filler yarns of said first layer having a pitch direction opposite to that of said second layer.

References Cited in the file of this patent

UNITED STATES PATENTS

| | | |
|---|---|---|
| 1,920,482 | Toulmin | Aug. 1, 1933 |
| 2,661,045 | Huber | Dec. 1, 1953 |
| 2,793,150 | Deaves | May 21, 1957 |
| 2,983,637 | Schmidt | May 9, 1961 |

FOREIGN PATENTS

| | | |
|---|---|---|
| 1,193,326 | France | Apr. 27, 1959 |